United States Patent [19]

Hamer et al.

[11] Patent Number: 5,049,240
[45] Date of Patent: Sep. 17, 1991

[54] VACCUM DISTILLATION SYSTEM

[75] Inventors: Johannes A. Hamer; Cornelis J. Van Der Burg; Dirk Kanbier; Pieter Van Der Heijden, all of The Hague, Netherlands

[73] Assignee: Shell Oil Company, Houston, Tex.

[21] Appl. No.: 476,185

[22] Filed: Feb. 7, 1990

[30] Foreign Application Priority Data

Feb. 10, 1989 [GB] United Kingdom ................ 8903007

[51] Int. Cl.⁵ ........................ B01D 3/10; F28F 13/00
[52] U.S. Cl. .............................. 802/153; 122/235.14; 159/DIG. 16; 165/147; 202/205; 202/262; 203/91
[58] Field of Search ....................... 202/153, 262, 205; 159/43.1, DIG. 16, 28.4; 203/91; 165/147; 122/18, 235.14, 247, 249

[56] References Cited

U.S. PATENT DOCUMENTS

| | | | |
|---|---|---|---|
| 3,492,795 | 2/1970 | Guerrieri | 202/153 |
| 3,662,716 | 5/1972 | Stevens | 165/147 |
| 3,675,710 | 7/1972 | Ristow | 165/147 |
| 3,692,103 | 9/1972 | Andoniev et al. | 165/147 |
| 3,724,523 | 4/1973 | Mattern | 165/147 |
| 4,108,241 | 8/1978 | Fortini et al. | 165/146 |
| 4,218,226 | 8/1980 | Boozer | 55/274 |
| 4,292,140 | 9/1981 | Kawasaki et al. | 203/22 |
| 4,405,449 | 9/1983 | Trager | 202/153 |

Primary Examiner—Virginia Manoharan
Attorney, Agent, or Firm—Ronald R. Reper

[57] ABSTRACT

Vacuum distillation system which has a vacuum distillation column (1) having a column inlet (6), a bottom outlet (8) and a top outlet (10), a furnace (2) provided with a heat-exchange tube (27) having a tube inlet (28) and a tube outlet (29), and a connecting conduit (3) extending between the tube outlet (29) and the column inlet (6), wherein the inner diameter of the heat-exchange tube (27) increases along the length of the heat-exchange tube (27) to between 2.4 and three times the inner diameter of the tube inlet (28), and wherein the inner diameter of the connecting conduit (3) gradually increases along the length of the connecting conduit (3) to between 2.5 and 5.4 times the inner diameter of the tube outlet (29).

6 Claims, 2 Drawing Sheets

VACCUM DISTILLATION SYSTEM

BACKGROUND OF THE INVENTION

The present invention relates to a vacuum distillation system wherein feed is heated by indirect heat exchange in tubes of increasing diameter and through a conduit of gradually increasing diameter passed to a vacuum distillation column. The system comprises a vacuum distillation column having a column inlet, a bottom outlet and a top outlet, a furnace provided with a heat-exchange tube having a tube inlet and a tube outlet, and a connecting conduit provided with an inlet end connected to the tube outlet and an outlet end which is in fluid communication with the column inlet.

Such a vacuum distillation system may be used to fractionate a hydrocarbon-containing feed which feed is sometimes referred to as long residue. During normal operation the absolute pressure in the vacuum distillation column is maintained between 650 and 5 200 Pa. Liquid feed passing through the heat-exchange tube in the furnace is partly vaporized and the partly vaporized feed i supplied through the connecting conduit to the column inlet at a temperature of between 380° and 425° C.

It is an object of the present invention to provide a vacuum distillation device which allows vaporization of a major part of the feed upstream the column inlet.

SUMMARY OF THE INVENTION

To this end the vacuum distillation system according to the invention comprises an upright vacuum distillation column having a column inlet, a bottom outlet and a top outlet, a furnace provided with a heat-exchange tube having a tube inlet and a tube outlet, and a connecting conduit having an inlet end connected to said tube outlet and an outlet end which is i fluid communication with the column inlet, wherein the inner diameter of said heat-exchange tube increases along its length to between 2.4 and 3 times the inner diameter of the tube inlet, and wherein the inner diameter of said connecting conduit gradually increases along its length to between 2.5 and 5.4 times the inner diameter of the tube outlet.

BRIEF DESCRIPTION OF THE DRAWINGS

The present invention will now be described by way of example in more detail with reference to the accompanying drawings, wherein.

DESCRIPTION OF PREFERRED EMBODIMENTS

During normal operation of the vacuum distillation system according to the invention only less than 50% by weight of the feed is vaporized in the heat-exchange tube in the furnace and more feed is vaporized in the connecting conduit, so that at the outlet end of the connecting conduit the feed comprises up to about 0.9 kg vapour/kg feed.

To be able to reduce during normal operation vaporization i the heat-exchange tube and to control the velocity of the fluid in the end part of the heat-exchange tube at 95% of the length of the heatexchange tube its inner diameter is between 1.0 and 1.6 times the inner diameter of the tube inlet of the heat-exchange tube, and at 98% of the length of the heat-exchange tube its inner diameter is between 1.7 and 2.3 times the inner diameter of the tube inlet.

Suitably at a quarter of the length of the connecting conduit its inner diameter is between 1.0 and 1.8 times the inner diameter of the tube outlet of the heat-exchange tube, at half of the length of the connecting conduit its inner diameter is between 1.3 and 2.8 times the inner diameter of the tube outlet, and at a three quarter of the length of the connecting conduit its inner diameter is between 1.7 and 4.5 times the inner diameter of the tube outlet.

The outlet end of the connecting conduit can be directly connected to the inlet of the distillation column. In an alternative embodiment, the vacuum distillation device further comprises a transfer conduit extending between the outlet end of the connecting conduit and the column inlet, which transfer conduit has an inner diameter which is between 0.7 and 5.7 times the inner diameter of the outlet end of the connecting conduit.

Figure 1:
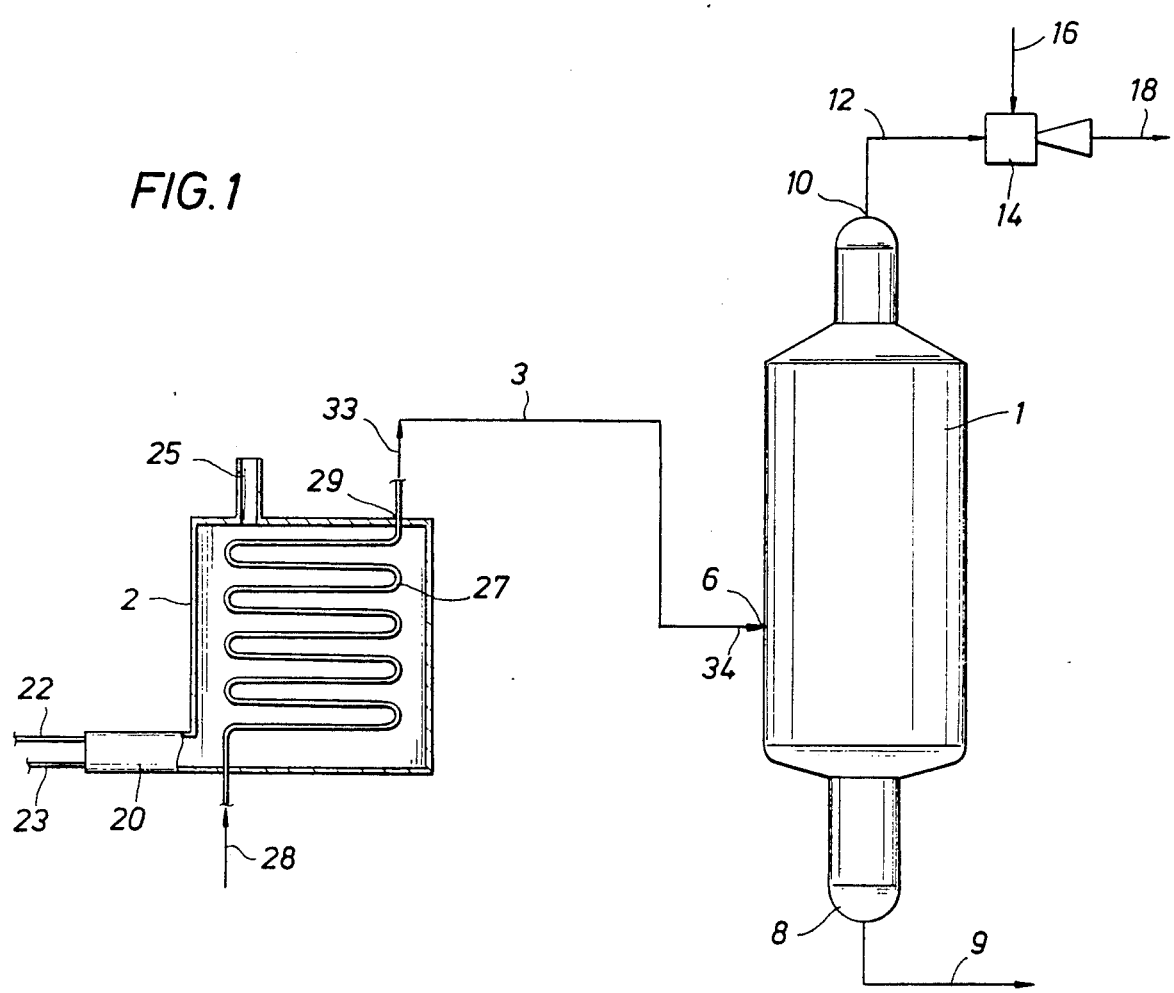
FIG. 1 shows schematically a partial cross-section of the vacuum distillation system according to the invention.

Reference is made to FIG. 1. The vacuum distillation device comprises a vacuum distillation column 1, a furnace 2 and a connecting conduit 3.

The upright vacuum distillation column 1 is provided with a column inlet 6, a bottom outlet 8 having a bottom outlet conduit 9 connected thereto, and a top outlet 10. The top outlet 10 is connected by conduit 12 to a vacuum source, e.g., steam ejector 14 which is provided with a steam inlet conduit 16 and an outlet conduit 18. The vacuum distillation column 1 is further provided with any conventional suitable internals and draw-off means (not shown).

The furnace 2 is provided with a burner 20 having a fuel supply conduit 22 and an oxidant supply conduit 23, a flue gas outlet conduit 25 and with a heat-exchange tube 27 having a tube inlet 28 and a tube outlet 29.

The connecting conduit 3 is provided with an inlet end 33 and an outlet end 34., the inlet end 33 is connected to the tube outlet 29 and the outlet end 34 is directly connected to the column inlet 6.

The inner diameter of the heat-exchange tube 27 increases along the length of the heat-exchange tube 27 (in the direction of fluid flow) to between 2.4 and 3 times the inner diameter of the tube inlet 28, and the inner diameter of the connecting conduit 3 gradually increases along the length of the connecting conduit (in the direction of fluid flow) to between 2.5 and 5.4 times the inner diameter of the tube outlet 29.

The inner diameter of the tube inlet 28 of the heat-exchange tube 27 is between 0.06 and 0.1 m, the length of the heat-exchange tube 27 is between 600 and 850 m, and the length of the connecting conduit 3 is between 50 and 70 m.

During normal operation the steam ejector 14 is operated to maintain a subatmospheric pressure in the vacuum distillation column 1 by supplying steam through the steam inlet conduit 16 to the steam ejector 14. Fuel and oxidant are supplied to the burner 20 of the furnace 2 to heat liquid feed supplied through tube inlet 28 and flue gas is removed from the furnace through the flue gas outlet conduit 25.

In the heat-exchange tube 27 the feed is partly vaporized, thus in the heat-exchange tube 27 there is always a liquid fraction present., this liquid fraction ensures a good heat transfer between the inner surface of the heat-exchange tube 27 and the feed flowing through the heat-exchange tube 27. An effect of the improved heat transfer is that the number of hot spots o the inner surface of wall of the heat transfer tube is reduced, so that the number of places at which liquid feed can be transformed to coke is reduced and thus the amount of fouling is reduced.

As the inner diameter of the connecting conduit 3 gradually increases, the liquid fraction of the feed is allowed to vaporize in the connecting conduit 3, so that a sufficiently large amount of the feed is vaporized.

Figure 2:
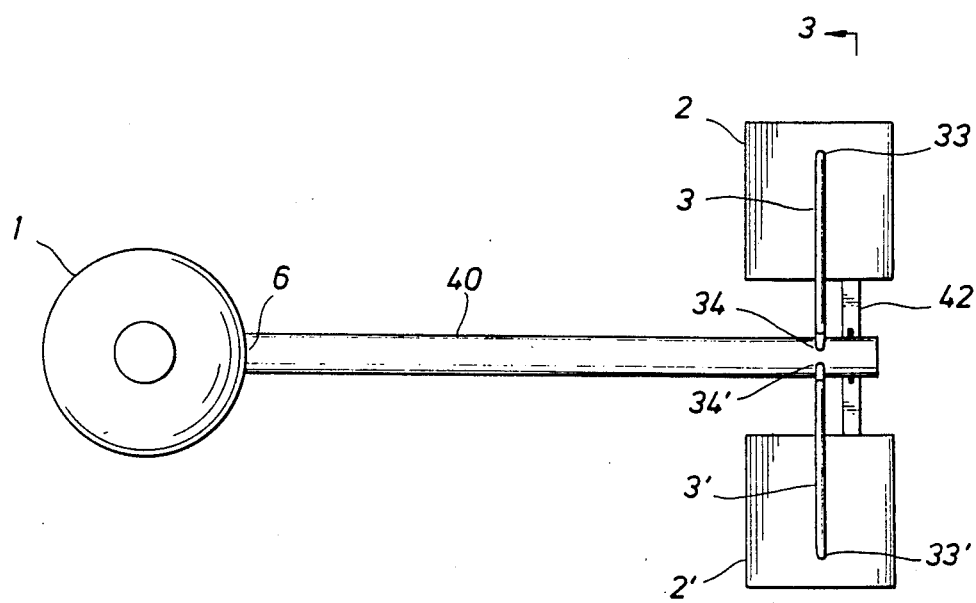
FIG. 2 shows a top view of an alternative construction of the vacuum distillation system according to the invention.
Figure 3:
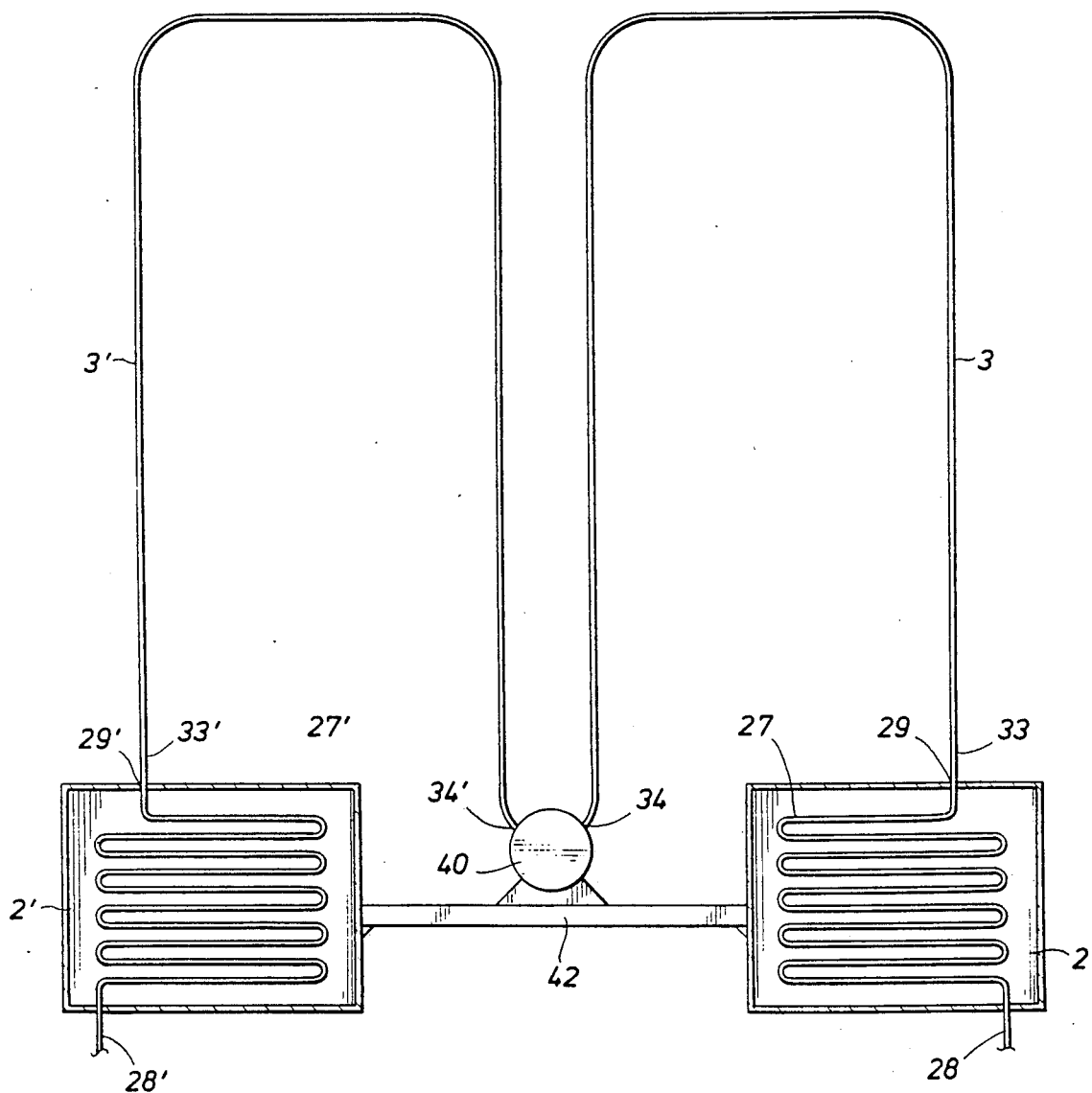
FIG. 3 shows section 3—3 of FIG. 2 drawn to a scale larger than the scale of FIG. 2.

Reference is now made to FIGS. 2 and 3. The vacuum distillation system comprises vacuum distillation column 1, two furnaces 2 and 2', and two connecting conduits 3 and 3'.

The vacuum distillation column 1 is provided with column inlet 6, a bottom outlet (not shown) with a bottom outlet conduit (not shown) connected thereto, and a top outlet (not shown). The top outlet is connected to a steam ejector (not shown). The vacuum distillation column 1 is further provided with suitable internals (not shown).

The furnace 2 is provided with a burner (not shown) having a fuel supply conduit (not shown) and an oxidant supply conduit (not shown), a flue gas outlet conduit (not shown) and with heat-exchange tube 27 having tube inlet 28 and tube outlet 29. The furnace 2' is provided with a burner (not shown) having a fuel supply conduit (not shown) and an oxidant supply conduit (not shown), a flue gas outlet conduit (not shown) and with heat-exchange tube 27' having tube inlet 28' and tube outlet 29'. The heat-exchange tubes 27 and 27' have the same dimensions.

The connecting conduit 3 is provided with inlet end 33 and outlet end 34., the inlet end 33 is connected to the tube outlet 29 and the outlet end 34 is in fluid communication with the column inlet 6 via transfer conduit 40. The connecting conduit 3' is provided with inlet end 33' connected to the tube outlet 29' and outlet end 34' which is in fluid communication with the column inlet 6 via transfer conduit 40. The transfer conduit 40 rests on support 42. The connecting conduits 3 and 3' have the same dimensions.

The inner diameters of the heat-exchange tubes 27 and 27' increase along the length of the heat-exchange tubes 27 and 27' to between 2.4 and 3 times the inner diameter of the tube inlets 28 and 28', and the inner diameter of the connecting conduits 3 and 3' gradually increase along the length of the connecting conduits to between 2.5 and 5.4 times the inner diameter of the tube outlets 29 and 29'.

The inner diameter of the tube inlets 28 and 28' of the heat-exchange tubes 27 and 27' is between 0.06 and 0.10 m, the length of the heat-exchange tubes 27 and 27' is between 5,200 and 6,200 m, and the length of the connecting conduits 3 and 3' is between 200 and 280 m.

The inner diameter of the transfer conduit 40 is between 2.7 and 5.7 times the inner diameter of the outlet end 34 of the connecting conduit 3, and the length of the transfer conduit 40 is between 25 and 35 m.

During normal operation a subatmospheric pressure is maintained in the vacuum distillation column 1. Fuel and oxidant are supplied to the burners of the furnaces 2 and 2' to heat liquid feed supplied through tube inlets 28 and 28' and flue gas is removed from the furnaces through the flue gas outlet conduits (not shown).

In the heat-exchange tubes 27 and 27' the feed is partly vaporized, thus in the heat-exchange tubes 27 and 27' there is always a liquid fraction present, this liquid fraction ensures a good heat transfer between the inner surface of the heat-exchange tubes 27 and 27' and the feed flowing through the heat-exchange tubes 27 and 27'.

As the inner diameters of the connecting conduits 3 and 3' gradually increase, the liquid fraction of the feed is allowed to vaporize in the connecting conduits 3 and 3'.

The good heat transfer in the heat-exchange tubes in the furnaces reduces fouling of the inner surface of the heat-exchange tube.

What is claimed is:

1. Vacuum distillation system which is an upright vacuum distillation column having a column inlet, a bottom outlet and a top outlet, a furnace provided with a heat-exchange tube having a tube inlet and a tube outlet, and a connecting conduit provided with an inlet end connected to said tube outlet and an outlet end which is in fluid communication with said column inlet, and a transfer conduit extending between the outlet end of the connecting conduit and the column inlet for providing communication therebetween, wherein the inner diameter of the heat-exchange tube increases along the length of the heat-exchange tube to between 2.4 and 3 times the inner diameter of the tube inlet and wherein the inner diameter of said connecting conduit gradually increases along the length of the connecting conduit to between 2.5 and 5.4 times the inner diameter of the tube outlet, and wherein said transfer conduit has an inner diameter which is between 0.7 and 5.7 times the inner diameter of the outlet end of said connecting conduit and that said heat exchange tube has an inner diameter between 0.06 and 0.1 m and a length between 600 and 850 m and the length of said connecting conduit is between 50 and 70 m.

2. Vacuum distillation system as in claim 1, wherein for 95% of the length of the heat-exchange tube its inner diameter is between 1.0 and 1.6 times the inner diameter of said tube inlet.

3. Vacuum distillation system as in claim 1, wherein at 98% of the length of the heat-exchange tube its inner diameter is between 1.7 and 2.3 times the inner diameter of said tube inlet.

4. Vacuum distillation system as in claim 1, wherein at a quarter of the length of said connecting conduit as measured from the inlet of said connecting conduit its inner diameter is between 1.0 and 1.8 times the inner diameter of said tube outlet.

5. Vacuum distillation system as in claim 1, wherein at half of the length of the connecting conduit as measured from the inlet of said connecting conduit its inner diameter is between 1.3 and 1.8 times the inner diameter of said tube outlet.

6. Vacuum distillation system as in claim 1, wherein at a three quarter of the length of the connecting conduit as measured from the inlet of said connecting conduit its inner diameter is between 1.7 and 4.5 times the inner diameter of said tube outlet.

* * * * *